Dec. 14, 1948.  J. G. SAWYER  2,456,151
AIRCRAFT ENGINE COOLING SYSTEM
Filed March 29, 1943  3 Sheets-Sheet 1
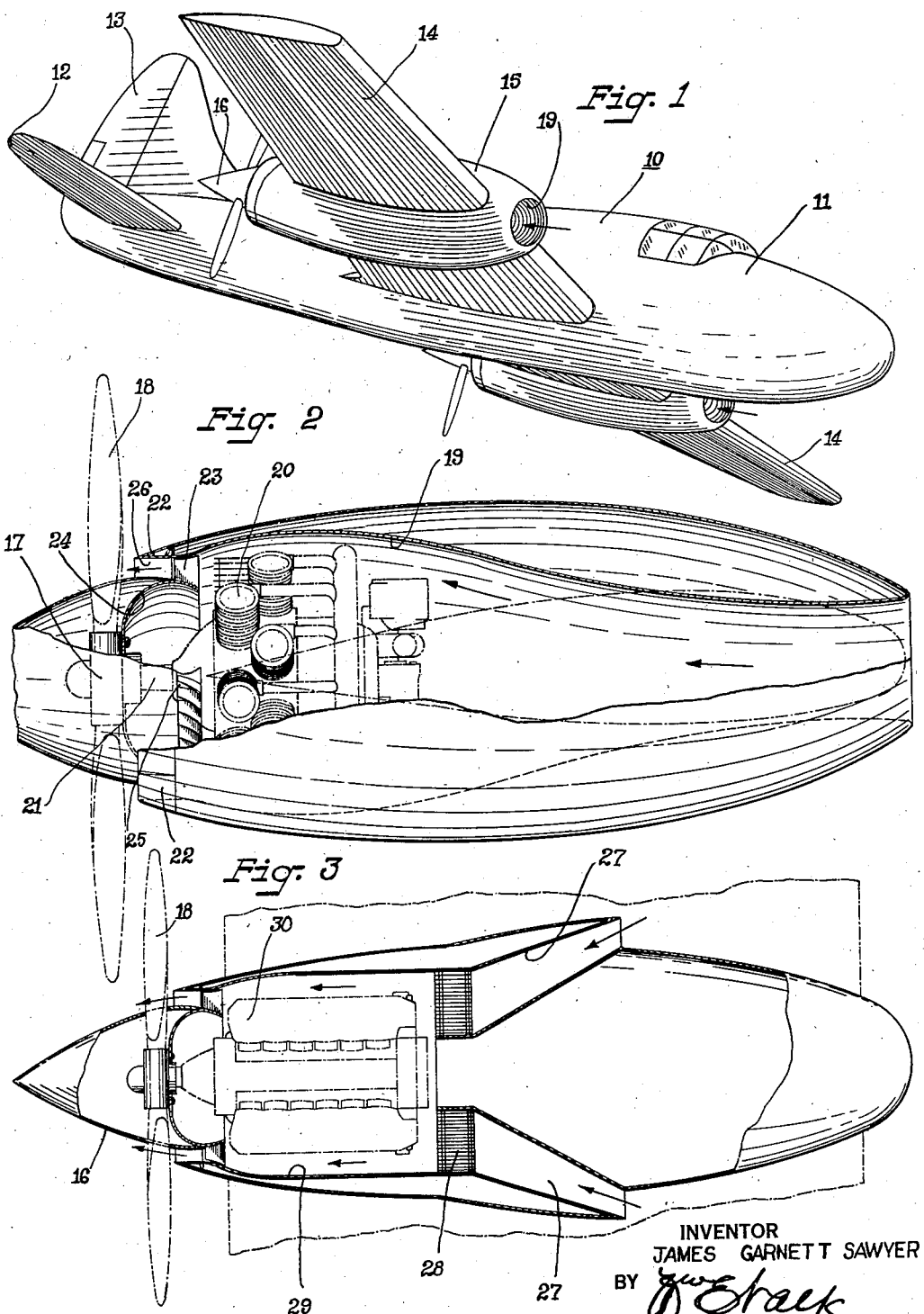
INVENTOR
JAMES GARNETT SAWYER
BY
ATTORNEY Dec. 14, 1948.  J. G. SAWYER  2,456,151
AIRCRAFT ENGINE COOLING SYSTEM
Filed March 29, 1943.  3 Sheets-Sheet 2
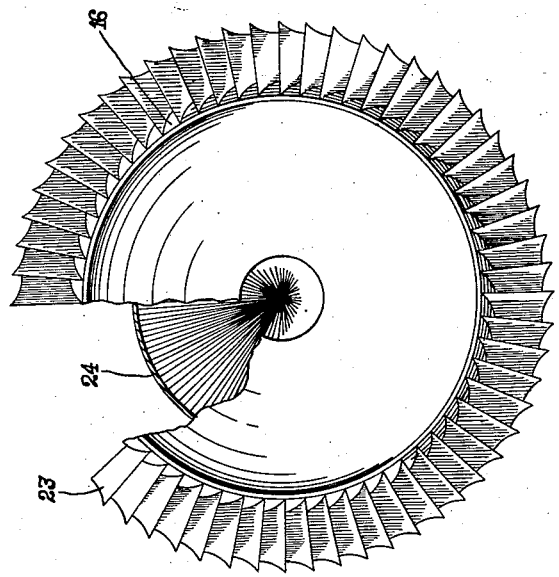
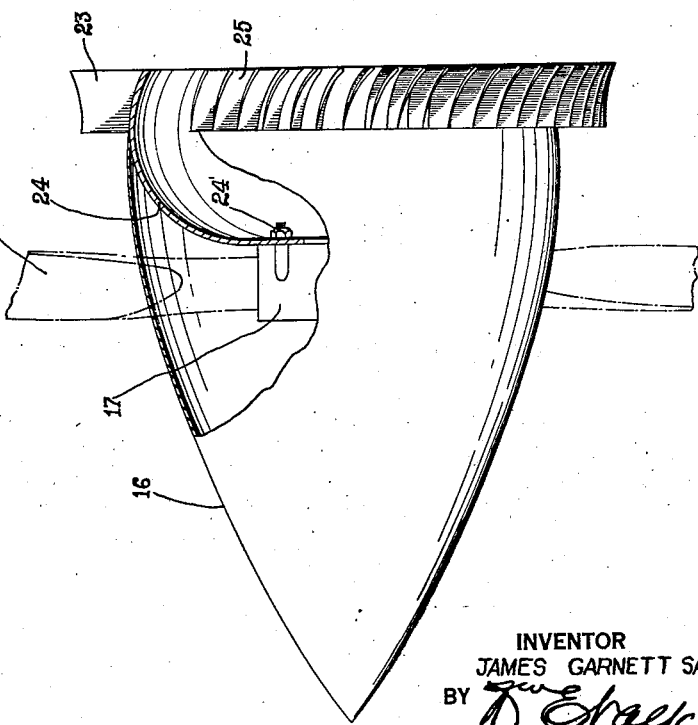
INVENTOR
JAMES GARNETT SAWYER
BY
ATTORNEY Dec. 14, 1948.  J. G. SAWYER  2,456,151
AIRCRAFT ENGINE COOLING SYSTEM
Filed March 29, 1943  3 Sheets-Sheet 3

INVENTOR
JAMES GARNETT SAWYER
BY
ATTORNEY

Patented Dec. 14, 1948

2,456,151

UNITED STATES PATENT OFFICE 2,456,151

AIRCRAFT ENGINE COOLING SYSTEM

James G. Sawyer, Williamsville, N. Y., assignor to Curtiss-Wright Corporation, a corporation of Delaware Application March 29, 1943, Serial No. 481,059

3 Claims. (Cl. 123—171)

This invention relates to airplanes and more particularly to cooling systems for airplane engines.

In order to make possible the use of the new aircraft engines being developed for high altitudes and for high power, it has become necessary that cooling fans be provided. It has proved difficult to secure adequate cooling effects from such fans, without markedly interfering with the aerodynamic characteristics of the airplanes involved. In addition, in all modern airplanes, particularly of a military type, it is desirable to keep the weight and volume of all apparatus to a minimum. It is readily apparent that it is an intricate problem of engineering design to provide a cooling system which will satisfy all these requirements to the optimum possible degree. With the conventional arrangements hitherto employed, the cooling system has proved to be inadequate.

It is an object of the present invention to provide a cooling system which is particularly adaptable for use with high power and high altitude engines, which for a given output is of practical weight and construction.

It is another object of the invention to provide such a cooling system for airplane engines which will leave the aerodynamics of the airplane relatively unaffected.

It is still another object of the invention to provide a novel cooling system for wing mounted airplane engines.

Other objects will appear hereinafter.

According to the present invention, an axial flow fan is provided in which the space occupied by the cooling air is reduced in cross-sectional area from the inlet to the outlet side of the fan, whereby a part of the total fan head will be delivered from the fan as kinetic energy rather than entire amount being delivered from the fan as static pressure head or potential energy as in the case of the conventional axial flow fans. The decreasing cross-sectional area gives an increasing velocity V and relatively high outlet velocity $V_o$. The outlet velocity $V_o$ is hence greater than the inlet velocity $V_i$ and the portion of the fan head represented by kinetic energy is $w/2g(V_o^2-V_i^2)$ where $w$ is the density of the air in pounds per cubic foot and $g$ the gravitational acceleration or 32.2 feet per second per second. The total output head of the fan is accordingly increased without increasing its static pressure rise. This total head or energy TH is the potential energy, PE, plus the kinetic energy, KE or in equation form, $$TH = PE + KE$$

The ratio of the static pressure head to the total head is known as the fan reaction.

The fan is placed in the engine cooling system directly before the exit to the outside atmosphere, so that the cooling air is delivered at high outlet velocities at a point where relatively high velocities of the airplane with respect to the surrounding atmosphere are maintained. In the pusher type engine installation, the annular air exit is usually directly before the propeller and thus the fan can be driven directly from the propeller hub.

In the preferred form of the invention, the fan blades themselves have a thin, highly cambered section developed on the stream filament theory and in a manner similar to that used in the steam turbine. The blade surfaces have a predominant, guiding action on the air and the space between the blades is treated purely as an air duct. Contravanes may be used when necessary at points of entrance and exit, to line up the air as it enters and leaves the fan. The pressure coefficient of such a fan increases with the flow and is between three and four times as high as can be developed with the airfoil-blade type fan. Any added thickness of the blades of such a fan is provided largely for strength rather than for aerodynamic reasons. In tests made of such a fan on a .395 scale of a nacelle at M. I. T. Wright Brothers wind tunnel, pressure coefficients above 3.0 were obtained and efficiencies of 70 to 80% prevailed over a wide flow range from between sea level and 30,000 ft. altitude conditions. The fan output head increased with increasing flow through the fan without any apparent stalling tendencies of the fan. The fan input remained about the same at sea level as at altitude and thus no adjustable blades of fan or of contravanes or variable speed of the fan were required. It was also determined that adjustable cowl flaps would still be required. Changes in the angle of attack of the nacelle had a negligible effect on the fan performance. The total head was comprised approximately of 23% potential energy and 77% kinetic energy.

For other objects and for a better understanding of the invention, reference may be had to the following detailed description taken in connection with the accompanying drawing, in which:

Fig. 1 is a perspective view of a pusher type airplane in flight incorporating the features of the present invention.

Fig. 2 is an enlarged elevational view taken through the nacelle section of the wing shown in Fig. 1 and showing more in detail the air conduit, the engine therein, the propeller arrangement, and the cooling fan of the present invention.

Fig. 3 is an enlarged view, in plan section, of a modified form of cooling system according to the present invention.

Fig. 4 is an enlarged elevational view, partly in section, of the propeller fairing and of the fan blades mounted thereon, according to either of the forms shown in Figures 2 and 3.

Fig. 5 is an end view looking into the fan shown in Figure 4 from the engine side thereof.

Figure 6:
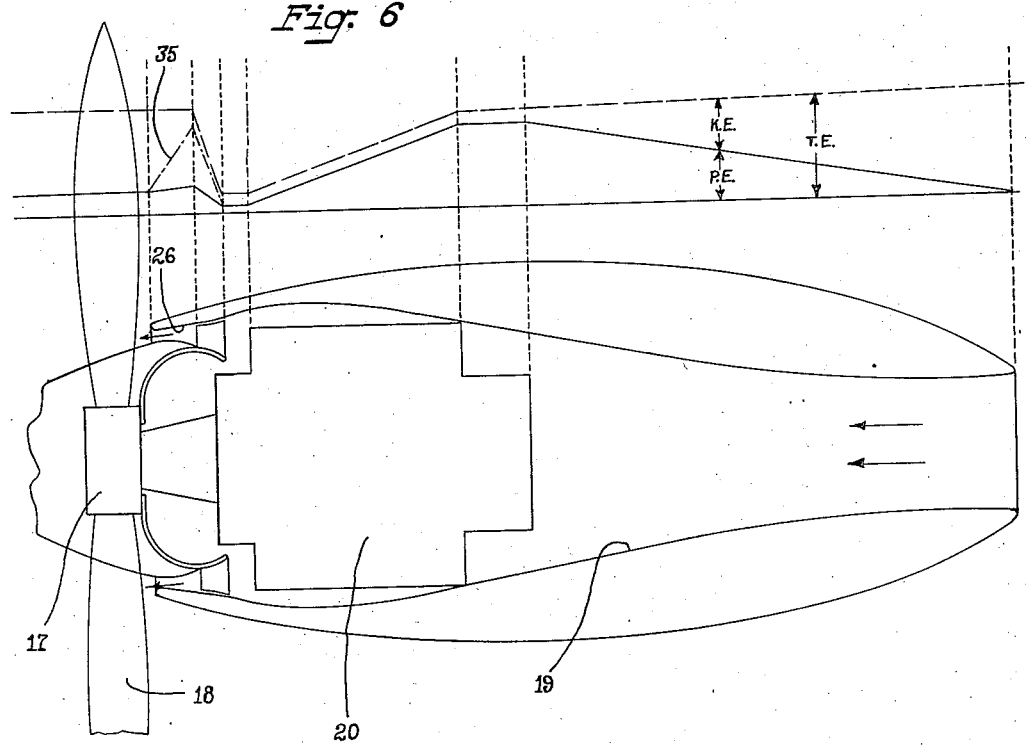
Fig. 6 is a diagrammatic view illustrating the total head or energy changes at different stages of advance of the air through the air conduit.

Referring now to the figures and for the present, particularly to Figs. 1 and 2, there is shown an airplane 10 of the pusher type having a central fuselage 11 with the usual controllable tail surfaces 12 and 13 thereon. Extending laterally from the fuselage are wings 14, each of which carry a nacelle 15 extending upwardly and downwardly from the upper and lower outline of the wing 14 and terminating rearwardly in a propeller fairing 16 surrounding a hub 17 of a propeller 18. The nose of the nacelle projects forwardly of the forward edge of the wing and has an air conduit 19 which extends throughout the length of the nacelle to supply cooling air for an engine 20 mounted therein. This engine 20 is located at the rear of the nacelle and is connected by means of a propeller shaft 21 to the propeller hub 17.

The air conduit 19 receives the air by virtue of the forward motion of the airplane. Immediately upon entering the conduit, the air is diffused to the reduced velocities maintained at the engine 20. At the rearward end of the conduit 19 are located hingeable flaps 22. These flaps can be opened to any extent desired. In the conduit 19 and attached to the fairing 16, there is provided a series of fan blades 23. These blades can be secured to the fairing in any desired manner, but preferably by welding. The fairing may include a radially extending supporting bracket 24 fastened to the propeller hub 17 by fastening bolts 24.

The blades 23 have considerable curvature and are so located with respect to one another as to provide spaces 25 through which air is forced to pass. The chordal length of the blades and the tip circumferential distance between the blades is such as to be a ratio of the order of two. The velocity of air in passing the engine is considerably reduced. By means of the fan, the velocity is brought up to nearly the velocity of the airplane so that it can be delivered from an exit portion 26 adjacent the flaps 22 without seriously destroying the aerodynamics of the airplane.

In order that the air will be delivered at this velocity, the spaces 25 are reduced in radial area from the inlet of the fan to the outlet. By virtue of this arrangement, the total head of the air delivered from the fan is mainly in the form of kinetic energy, and the static head will have risen slightly. While in the forms of the invention illustrated in Figures 2 and 6, inclusive, the contravanes have not been used, it shall be understood that under certain conditions or installations the same may be required, but that this will not, in any way, effect the principle being laid down by the present invention. If the inner radii at the inlet and outlet openings are respectively $r_i$ and $r_0$ and the tip radii at inlet and outlet openings are $R_i$ and $R_0$ respectively, the difference in the area at inlet and outlet will be represented by $\pi(R_i^2 - r_i^2)$ less $\pi(R_0^2 - r_0^2)$.

Referring now to Fig. 3, there is shown a modified form of air conduit wherein the air is taken through air ducts 27 located at the sides of the nacelle 15 and through which air is delivered over cooling radiators 28 for delivery to the space 29 in which is disposed an engine 30 adapted to drive the propeller 18. The arrangement of the cooling fan on the airplane fairing 16 is the same as that shown on Fig. 2 and the air is discharged or exhausted at velocities approximately equalling the airplane speed.

It should now be apparent that there has been provided for airplanes, a cooling fan preferably of the stream filament type, designed to take the air from the air conduit and deliver it at high velocity to the exit of the conduit without substantially increasing the static pressure thereof, whereby the velocity of the air is brought up to a velocity approximately equal the speed of the airplane.

Referring now to Fig. 6, there is shown, diagrammatically, the energy condition of the air at different stages through the air conduit. The total energy or head is represented by a dash line, while the static pressure head is represented by the full line. The difference between the total energy head and the static energy head is the kinetic energy. It will be noted that this kinetic energy at the entrance to the air conduit is high, gradually decreasing as the air is diffused to a location near the engine. At the same time, the kinetic energy decreases while the static energy increases. Across the engine, however, the total head is considerably reduced, the cooling effect of the air having been dissipated by the engine so that near the rear end of the engine, the total energy head is relatively low. At this location it is desired that the total head be brought up considerably to its initial amount and this is effected by means of the cooling fan located on the propeller fairing.

With the conventional arrangement hitherto employed, a considerable amount of static pressure rise was effected through the fan. The path of the static pressure rise was indicated by a dot-dash line 35. Very little kinetic energy was put into the air upon passing through the fan. With the present arrangement, the amount of kinetic energy is considerably increased and since the energy is proportional to the square of the velocity, the air upon passing through the fan may be given an increased velocity substantially equalling the airplane velocity. The velocity is kept up by the continued reduction in or nozzle effect of the exit passage 26. In conventional arrangement, a large diverging fan outlet opening is employed to reduce the static pressure rise, but without securing a corresponding increase in kinetic energy.

Figure 7:
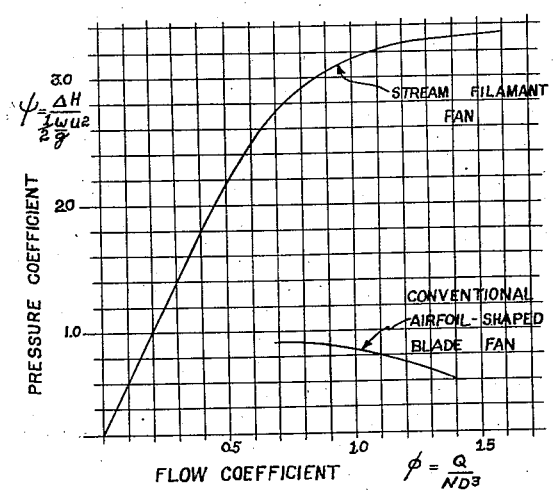
Fig. 7 is a graph of the pressure coefficient plotted against the flow coefficient and with the characteristic curves of a stream filament fan and a conventional axial flow fan plotted for comparison thereon.

Referring now to Fig. 7, there is shown a relationship of the pressure coefficient with respect to the flow coefficient for the two different types of fans. The pressure coefficient $\psi$ is represented by the equation:

$$\psi = \frac{\Delta H}{\dfrac{w}{g} u^2}$$

where $\Delta H$ is the difference between total outlet head $TH_0$ and total inlet head $TH_i$ and $u$ the tip velocity of a fan blade, while the flow coefficient $\phi$ is represented by equation:

$$\Phi = \frac{Q}{ND^3}$$

where Q is the cubic feet flow per second, N the number of revolutions of the fan per second, and D the diameter from blade tip to blade tip.

Figure 8:
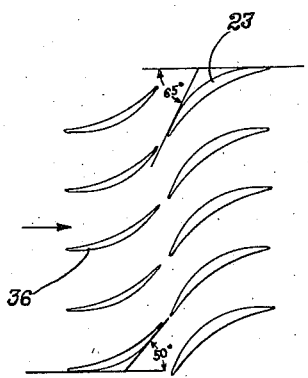
Fig. 8 is a diagrammatic illustration looking endwise at a stream filament fan provided with inlet vanes or contravanes, angled as they were when the upper curve of Fig. 7 was obtained.

It should be apparent from this graph, that a pressure coefficient of the order of three is obtained from the stream filament type fan, while with the conventional axial flow type fan, the pressure coefficient is well under unity, the characteristic curves for the two types of fans being compared on the graph. The stream filament fan which was tested, had inlet guide vanes or contravanes 36 set at an angle over 50° with the horizontal flow as indicated in Fig. 8. The angle curvature for the fan blades was approximately 65° as also indicated in Fig. 8.

It should now be apparent that there has been provided a cooling arrangement particularly adapted for use in airplanes wherein the velocity of the exit air can be brought to a range equalling the velocity of the airplane and that high fan heads are obtainable while the fans are operating at relatively low propeller speeds, whereby the aerodynamics of the airplane is largely unaffected by the air leaving the air conduit.

While various changes may be made in the detail construction, it shall be understood that such changes shall be made within the spirit and scope of the present invention as defined by the appended claims.

I claim as my invention:

1. In a cooling system for an aircraft engine having heat dissipating means with surface portions to be air cooled; a casing structure for said engine providing an air passageway in which said heat dissipating means is disposed, said passageway having a forwardly directed air inlet section and an annular rearwardly directed air outlet section; a fan disposed rearwardly of said engine and drivably connected thereto, said fan having a streamlined hub portion forming the inner wall of said annular air outlet section and having blades extending from said hub portion across the annular outlet section of said passageway, said fan hub portion extending rearwardly beyond said casing structure to form a substantially streamlined continuation of the outer surface of said casing; and cowl flaps adjustably secured to said casing structure for varying the extent to which the outlet of said passageway is opened.

2. In a cooling system for an aircraft engine having a pusher type propeller drivably connected thereto and having heat dissipating means with surface portions to be air cooled; a casing structure for said engine providing an air passageway in which said heat dissipating means is disposed, said passageway having a forwardly directed air inlet section and an annular rearwardly directed air outlet section; a fan disposed rearwardly of said engine and drivably connected thereto for rotation at the speed of said propeller, said fan having blades extending from the fan hub across said annular air outlet section with said blades having a substantially larger radial length at their leading edges than at their trailing edges; and a fairing for the hub of the propeller faired with the hub of said fan, said fairing comprising a substantially streamlined continuation of the outer surface of said casing.

3. In a cooling system for an aircraft engine having a pusher type propeller drivably connected thereto and having heat dissipating means with surface portions to be air cooled; a casing structure for said engine providing an air passageway in which said heat dissipating means is disposed, said passageway having a forwardly directed air inlet section and an annular rearwardly directed air outlet section; a fan disposed rearwardly of said engine and drivably connected thereto for rotation at the speed of said propeller, said fan having blades extending from the fan hub across said annular air outlet section with said blades each having a substantially larger radial length at their leading edges than at their trailing edges; a fairing for the hub of the propeller faired with the hub of said fan, said fairing comprising a substantially streamlined continuation of the outer surface of said casing; and cowl flaps adjustably secured to said casing structure for varying the extent to which the outlet of said passageway is opened.

JAMES G. SAWYER.

REFERENCES CITED

The following references are of record in the file of this patent:

UNITED STATES PATENTS

| Number | Name | Date |
|---|---|---|
| 1,386,493 | Guyot | Aug. 2, 1921 |
| 1,712,622 | Kruckenberg et al. | May 14, 1929 |
| 1,794,844 | Gienger | Mar. 3, 1931 |
| 1,873,505 | Stipa | Aug. 23, 1932 |
| 1,881,486 | Gilstrap | Oct. 11, 1932 |
| 1,997,506 | Adamicikas | Apr. 9, 1935 |
| 2,118,052 | Odor | May 24, 1938 |
| 2,145,131 | Rhines | Jan. 24, 1939 |
| 2,169,232 | Flanders | Aug. 15, 1939 |
| 2,194,060 | Van Vactor | Mar. 19, 1940 |
| 2,219,499 | Troller | Oct. 29, 1940 |
| 2,330,622 | Ramshorn | Sept. 28, 1943 |
| 2,403,797 | Hersey | July 9, 1946 |
| 2,426,635 | Mercier | Sept. 2, 1947 |